US009645923B1

(12) United States Patent
Hara (10) Patent No.: US 9,645,923 B1
(45) Date of Patent: May 9, 2017

(54) GENERATIONAL GARBAGE COLLECTOR ON MULTIPLE HEAPS

(71) Applicant: Google Inc., Mountain View, CA (US)

(72) Inventor: Kentaro Hara, Tokyo (JP)

(73) Assignee: GOOGLE INC., Mountain View, CA (US)

( * ) Notice: Subject to any disclaimer, the term of this patent is extended or adjusted under 35 U.S.C. 154(b) by 200 days.

(21) Appl. No.: 14/023,291

(22) Filed: Sep. 10, 2013

(51) Int. Cl.
*G06F 7/00* (2006.01)
*G06F 17/30* (2006.01)
*G06F 12/02* (2006.01)

(52) U.S. Cl.
CPC .... *G06F 12/0253* (2013.01); *G06F 17/30132* (2013.01); *G06F 17/30156* (2013.01)

(58) Field of Classification Search
CPC ......... G06F 17/30516; G06F 17/30132; G06F 17/30138
USPC ....................................................... 711/170
See application file for complete search history.

(56) References Cited

U.S. PATENT DOCUMENTS

| | | | |
|---|---|---|---|
| 5,088,036 A * | 2/1992 | Ellis et al. | |
| 5,146,548 A | 9/1992 | Bijnagte | |
| 5,473,777 A * | 12/1995 | Moeller et al. | 719/328 |
| 5,495,539 A | 2/1996 | Sieverding | |
| 5,710,839 A | 1/1998 | Cok | |
| 5,745,703 A * | 4/1998 | Cejtin | G06F 9/546 |
| | | | 707/999.01 |
| 5,901,253 A | 5/1999 | Tretter | |
| 5,929,867 A | 7/1999 | Herbstman et al. | |
| 5,933,543 A | 8/1999 | Cok | |
| 5,989,134 A * | 11/1999 | Antonious | A63B 53/04 |
| | | | 473/327 |
| 6,028,603 A | 2/2000 | Wang et al. | |
| 6,049,636 A | 4/2000 | Yang | |
| 6,249,793 B1 * | 6/2001 | Printezis | G06F 12/0269 |
| 6,456,732 B1 | 9/2002 | Kimbell et al. | |
| 6,587,596 B1 | 7/2003 | Haeberli | |
| 6,590,590 B1 | 7/2003 | Wen et al. | |
| 6,898,316 B2 | 5/2005 | Zhou | |
| 6,934,698 B2 | 8/2005 | Judd et al. | |
| 6,957,237 B1 * | 10/2005 | Traversat | G06F 12/0269 |

(Continued)

FOREIGN PATENT DOCUMENTS

JP 07-168872 7/1995

OTHER PUBLICATIONS

EP 0288146 B1.*

(Continued)

*Primary Examiner* — Daniel Kuddus
(74) *Attorney, Agent, or Firm* — McDermott Will & Emery LLP (57) ABSTRACT

The subject technology discloses configurations for determining a list of wrappers in a new space of a host heap that include a reference to at least one object in a guest heap; marking a set of objects in a new space of the guest heap; building an eden graph for the guest heap; marking a set of objects in the new space of the host heap based on a reachability in the eden graph; determining a list of marked wrappers from the host heap that are included in the eden graph of the guest heap; marking a set of wrappers in the new space of the guest heap that are included in the list of marked wrappers in the eden graph; and collecting a set of unmarked objects from the host heap and the guest heap.

24 Claims, 10 Drawing Sheets

(56) References Cited

U.S. PATENT DOCUMENTS

| | | | |
|---|---|---|---|
| 6,973,220 B2 | 12/2005 | Sakurai et al. | |
| 7,034,848 B2 | 4/2006 | Sobol | |
| 7,174,354 B2* | 2/2007 | Andreasson | G06F 12/0253 |
| 7,454,711 B2 | 11/2008 | Angiulo et al. | |
| 7,624,137 B2* | 11/2009 | Bacon | G06F 12/0253 |
| 7,634,715 B2 | 12/2009 | Hertzfeld et al. | |
| 7,656,543 B2 | 2/2010 | Atkins | |
| 7,668,835 B2 | 2/2010 | Judd et al. | |
| 7,792,880 B2* | 9/2010 | Arnold | G06Q 50/30 |
| | | | 707/817 |
| 7,978,918 B2 | 7/2011 | Scalise et al. | |
| 7,996,446 B2* | 8/2011 | Bacon | G06F 12/0253 |
| | | | 707/816 |
| 8,024,505 B2* | 9/2011 | Dahlstedt et al. | 711/6 |
| 8,156,492 B2* | 4/2012 | Dahlstedt | 718/1 |
| 8,577,166 B1 | 11/2013 | Ferguson et al. | |
| 8,949,295 B2* | 2/2015 | McDougall | G06F 12/023 |
| | | | 707/813 |
| 2001/0006560 A1 | 7/2001 | Gilman et al. | |
| 2001/0048447 A1 | 12/2001 | Jogo | |
| 2002/0044154 A1 | 4/2002 | Baar et al. | |
| 2002/0113862 A1 | 8/2002 | Center et al. | |
| 2002/0129343 A1* | 9/2002 | Pinter | G06F 8/434 |
| | | | 717/140 |
| 2002/0135621 A1 | 9/2002 | Angiulo et al. | |
| 2003/0012414 A1 | 1/2003 | Luo | |
| 2003/0035578 A1 | 2/2003 | Dupin et al. | |
| 2003/0128390 A1 | 7/2003 | Yip et al. | |
| 2003/0147563 A1 | 8/2003 | Liu et al. | |
| 2003/0174869 A1 | 9/2003 | Suarez | |
| 2004/0001636 A1 | 1/2004 | Miceli et al. | |
| 2004/0032599 A1 | 2/2004 | Atkins et al. | |
| 2004/0036720 A1 | 2/2004 | Dworsky | |
| 2004/0039759 A1* | 2/2004 | Detlefs | G06F 12/0276 |
| 2004/0076342 A1 | 4/2004 | Wolff et al. | |
| 2004/0170337 A1 | 9/2004 | Simon et al. | |
| 2004/0190059 A1 | 9/2004 | Winter et al. | |
| 2005/0007382 A1 | 1/2005 | Schowtka | |
| 2005/0094206 A1 | 5/2005 | Tonisson | |
| 2005/0149585 A1* | 7/2005 | Bacon | G06F 12/0269 |
| 2005/0190202 A1 | 9/2005 | Suzuki et al. | |
| 2005/0276477 A1 | 12/2005 | Lin et al. | |
| 2006/0078226 A1 | 4/2006 | Zhou | |
| 2006/0103891 A1 | 5/2006 | Atkins | |
| 2006/0188173 A1 | 8/2006 | Zhang et al. | |
| 2006/0197963 A1 | 9/2006 | Royal et al. | |
| 2006/0240873 A1 | 10/2006 | You et al. | |
| 2006/0279655 A1 | 12/2006 | Chen et al. | |
| 2007/0024909 A1 | 2/2007 | Hanechak | |
| 2007/0025637 A1 | 2/2007 | Setlur et al. | |
| 2008/0112621 A1 | 5/2008 | Gallagher et al. | |
| 2008/0175431 A1 | 7/2008 | Hayashi | |
| 2008/0256439 A1 | 10/2008 | Boreham et al. | |
| 2009/0070776 A1* | 3/2009 | Dahlstedt | 719/312 |
| 2009/0150465 A1* | 6/2009 | Branda | G06F 12/0253 |
| 2009/0200086 A1* | 8/2009 | Bagassi | E21B 19/084 |
| | | | 175/85 |
| 2009/0248766 A1* | 10/2009 | Garthwaite | G06F 12/0276 |
| 2010/0042799 A1* | 2/2010 | Printezis | G06F 12/0269 |
| | | | 711/170 |
| 2010/0228769 A1* | 9/2010 | Dorn et al. | 707/769 |
| 2010/0228796 A1* | 9/2010 | Goetz | G06F 12/0253 |
| | | | 707/814 |
| 2010/0231609 A1 | 9/2010 | Chatting et al. | |
| 2011/0087926 A1* | 4/2011 | Arnold | G06F 11/3636 |
| | | | 714/38.1 |
| 2011/0161615 A1* | 6/2011 | Odaira | G06F 12/0269 |
| | | | 711/166 |
| 2012/0185854 A1* | 7/2012 | Dahlstedt | 718/1 |
| 2012/0233435 A1* | 9/2012 | Ben-Yehuda | G06F 9/5077 |
| | | | 711/170 |
| 2012/0246204 A1* | 9/2012 | Nalla | G06F 12/0253 |
| | | | 707/815 |
| 2013/0290641 A1* | 10/2013 | Corrie | G06F 12/0875 |
| | | | 711/133 |
| 2013/0339568 A1* | 12/2013 | Corrie | G06F 12/023 |
| | | | 711/6 |
| 2014/0283040 A1* | 9/2014 | Wilkerson | G06F 21/52 |
| | | | 726/22 |
| 2014/0283940 A1* | 9/2014 | Bourgeois et al. | 138/137 |
| 2015/0199119 A1 | 7/2015 | Ferguson et al. | |

OTHER PUBLICATIONS

Liu et al., Automatic Browsing of Large Pictures on Mobile Devices, 2003, Proceedings of the 11th ACM International Conference on Multimedia, ACM pp. 148-155.

Setlur et al., "Automatic Image Retargeting," 2005, Mobile nad Ubiquitous Multimedia (MUM), ACM, pp. 59-68.

Suh et al., "Automatic thumbnail cropping and its effectiveness," 2003 Proceedings of the 16th Annual ACM Symposium on User Interface Software and Technology, pp. 95-104.

Zhang et al., "Auto cropping for digital photographs," 2005, IEEE Conf on Multimedia and Expo, 4 pages.

\* cited by examiner

GENERATIONAL GARBAGE COLLECTOR ON MULTIPLE HEAPS

BACKGROUND

The present disclosure generally relates to performing garbage collection for providing memory management.

SUMMARY

The subject technology provides for a computer-implemented method, the method including: determining a list of wrappers in a new space of a host heap that include a reference to at least one object in a guest heap; marking a set of objects in a new space of the guest heap; building an eden graph for the guest heap; marking a set of objects in the new space of the host heap based on a reachability in the eden graph; determining a list of marked wrappers from the host heap that are included in the eden graph of the guest heap; marking a set of wrappers in the new space of the guest heap that are included in the list of marked wrappers in the eden graph; and collecting a set of unmarked objects from the host heap and the guest heap.

Yet another aspect of the subject technology provides a system. The system includes one or more processors, and a memory including instructions stored therein, which when executed by the one or more processors, cause the processors to perform operations including: determining a list of wrappers in a new space of a host heap that include a reference to at least one object in a guest heap; marking a set of objects in a new space of the guest heap; building an eden graph for the guest heap; marking a set of objects in the new space of the host heap based on a reachability in the eden graph; determining a list of marked wrappers from the host heap that are included in the eden graph of the guest heap; marking a set of wrappers in the new space of the guest heap that are included in the list of marked wrappers in the eden graph; and collecting a set of unmarked objects from the host heap and the guest heap.

The subject technology further provides for a non-transitory machine-readable medium comprising instructions stored therein, which when executed by a machine, cause the machine to perform operations including: determining a list of wrappers in a new space of a host heap that include a reference to at least one object in a guest heap; marking a set of objects in a new space of the guest heap; building an eden graph for the guest heap; marking a set of objects in the new space of the host heap based on a reachability in the eden graph; determining a list of marked wrappers from the host heap that are included in the eden graph of the guest heap; marking a set of wrappers in the new space of the guest heap that are included in the list of marked wrappers in the eden graph; and collecting a set of unmarked objects from the host heap and the guest heap.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several configurations of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

A garbage collector, typically implemented in software, provides automatic memory management that attempts to reclaim memory occupied by objects that are no longer in use by a given application. In some implementations, a garbage collector may determine which objects are reachable, and then discard other remaining objects. In one example, an object is reachable if it is referenced by at least one variable in the application, either directly or through references from other reachable objects. However, some memory leaks, in which an application fails to free memory occupied by objects that have become unreachable, may lead to memory exhaustion.

In some instances, the most recently created objects are also the objects that are more likely to become unreachable. To address this, a generational garbage collector may be provided for dividing objects into "generations" based on a time of being created, and placing only the objects of a subset of generations into an initial set of objects that are candidates for having their memory recycled. In some implementations, a generational garbage collector may utilize separate memory regions for different ages of objects. When a respective region becomes full, the objects that are referenced from a younger memory region(s) are then "promoted" or moved to the next highest (older) region, and the entire younger region can be overwritten with new objects. This approach may allow for faster garbage collection (GC), since the garbage collection of only one region at a time is performed. Generational GC therefore may not reclaim some unreachable objects on each garbage collection cycle. In some instances, it may be necessary to perform a full garbage collection that scans all objects to reclaim all available space. In this regard, most collection cycles of a given garbage collector may only look at a few generations, while occasionally a full collection is performed. The terms "minor cycle" and "major cycle" may be used to describe the degree of garbage collection that is performed by the garbage collector.

A generational garbage collector may perform minor GC cycles and major GC cycles. In some instances, objects that die young (e.g., unreachable) are expected to be collected during minor GC cycles. Objects that live longer are expected to be promoted from a newer space to an older space, and collected during major GC cycles. As used herein, the term "space" refers to a region of memory for storing one or more objects grouped according to age (e.g., a time that the object was created). However, a difficulty may arise when a generational garbage collector is intended to work on multiple heaps. Multiple heaps may mean that there are multiple independent object graphs (e.g., for objects from each of the heaps or more). It may be easier to make major GC cycles work on multiple heaps, because the major GC cycles are allowed to scan all objects in the multiple heaps. On the other hand, it may be more difficult to make minor GC cycles work on multiple heaps, because the minor GC cycles are only allowed to scan a (small) part of each object graph. Given that there may be references that cross object graphs, it can be more difficult to determine the reachability of objects just by scanning a part of each object graph during such minor GC cycles.

In a given web browser, a generational garbage collector may have to collect objects in two object graphs: a JavaScript object graph and a document object model (DOM) object graph (e.g., DOM trees). However, the generational garbage collector may not collect DOM wrappers in minor GC cycles due to the complexity described above. In terms of performance, the maximum stop time of major GC cycles may become unacceptably large. In terms of memory, already dead DOM objects had been kept alive for a long time. To address these problems, the subject technology provides a garbage collector process that enables minor GC cycles to collect objects in two or more object graphs in two or more respective heaps.

In some configurations, the subject technology provides garbage collection (GC) for one host heap and N guest heaps, where N can be one or more. The host heap is a heap on which GC is triggered and may include new and old spaces. A GC on the host heap controls garbage collections on guest heaps in which each guest heap includes new and old spaces. From the perspective of garbage collections, a GC on the host heap is a "master" GC, and garbage collections on guest heaps are "slave" garbage collections ("GCs").

In some configurations, there are three types of refereneces:

[1] References inside one space in one heap

[2] References between two spaces (e.g., new space and old space) in one heap

[3] References between two spaces in two different heaps. In the case of [3], the reference is represented as a reference between wrapper objects. The reachability are assumed as bidirectional. (e.g., this is a practical assumption).

Each heap may include one or more wrapper objects that reference objects in other heaps. Further, each heap may include "pure" objects that do not reference other objects in other heaps.

In some configurations, it is assumed that a reference between two heaps are represented as a reference between two wrappers. For example, if a DOM object X has a JavaScript wrapper X', then X can be considered a wrapper in the DOM side and X' can be considered a wrapper in the JavaScript side. For simplicity, it is assumed that two corresponding wrappers are bidirectionally referenced.

Figure 1:
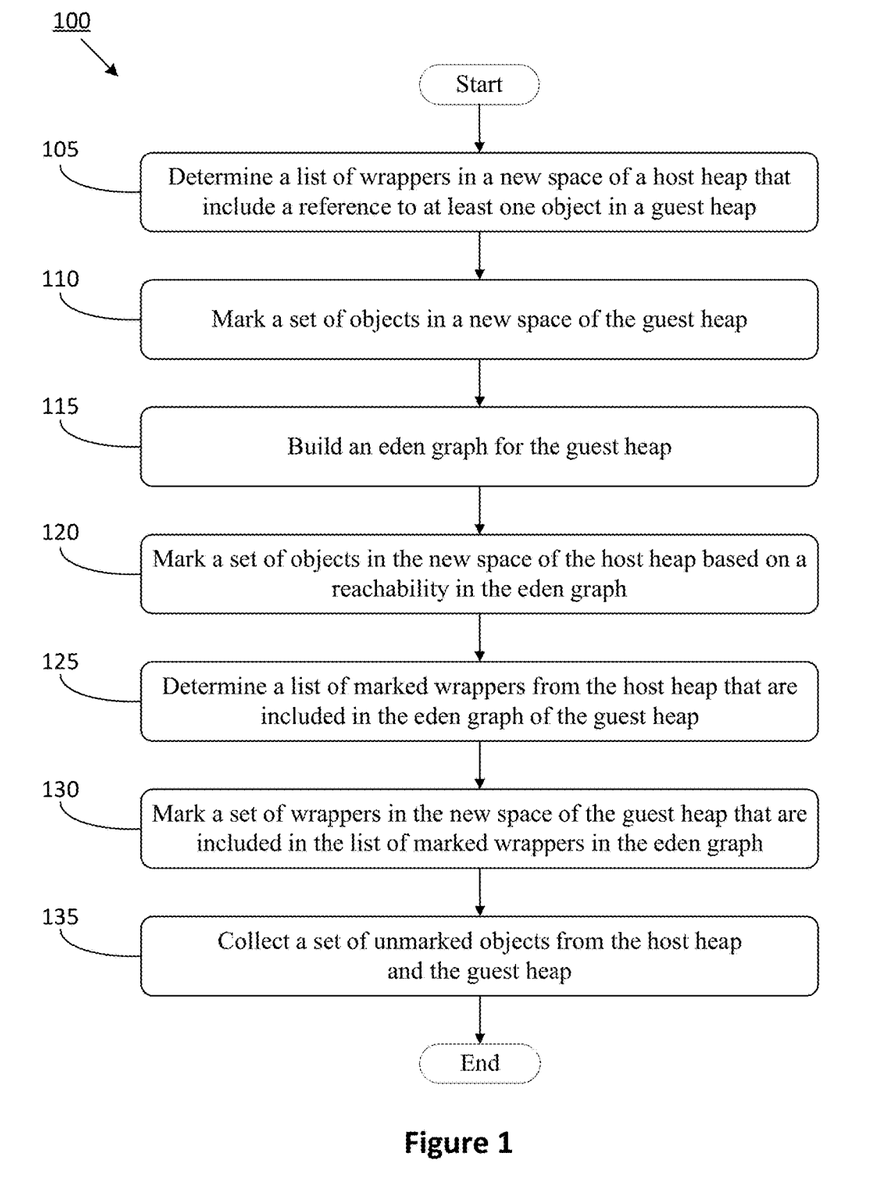
FIG. 1 illustrates an example process for a generational garbage collector according to some configurations of the subject technology.

FIG. 1 illustrates an example process 100 for a generational garbage collector according to some configurations of the subject technology.

Step 105: Determining a list of wrappers in a new space of a host heap that have reference(s) to at least one object in a guest heap that will undergo GC triggered by the host heap.

Step 110: Marking a set of objects in a new space of the guest heap. The root objects of this marking operation(s) are as follows:

a) normal root objects of the guest heap b) a "remembered" set of the guest heap (e.g., objects in the new space of the guest heap that are referenced from the old space of the guest heap)

c) wrappers in the new space of the guest heap that are not contained in the list of wrappers in the new space of the host heap.

In other words, this marking operation results in not treating wrappers in the new space of the guest heap that are contained in the list of wrappers in the new space of the host heap as root objects.

Step 115: Building an eden graph for the guest heap. In some configurations, the eden graph is built up as a graph (e.g., a reachability graph) of unmarked wrappers in the new space of the guest heap. By building up the eden graph as a graph of unmarked wrappers in the new space of the guest heap, the following conditions for the eden graph are guaranteed:

[1] All nodes in the eden graph are wrappers between the host heap and the guest heap

[2] wrapper X in the eden graph is unreachable if all ancestor wrappers of X in the new space of the host heap are unreachable It is clear that the eden graph guarantees [1]. Regarding [2], remember that the marking operation treats "wrappers that are reachable from spaces other than the new space of the host heap" as root objects. As a result, unmarked objects in the new space of the guest heap constitute a set of objects that are not reachable without being reachable from the new space of the host heap. Therefore, by building up the eden graph as a graph of unmarked wrappers in the new space of the guest heap, [2] is also guaranteed.

Step 120: Marking objects in the new space of the host heap by taking into account the reachability in the eden graph. The root objects of the marking phase are as follows:

a) normal root objects of the host heap b) a "remembered" set of the host heap (e.g., objects in the new space of the host heap that are referenced from the old space of the host heap)

c) wrappers in the new space of the host heap that are not contained in the eden graph.

In other words, this marking operation results in not treating wrappers in the new space of the host heap that are not contained in the eden graph as root objects.

Step 125: Determining a list of marked wrappers from the host heap that are in the eden graph of the guest heap. By utilizing this information, the guest heap can know which wrappers are marked or unmarked in the host side.

Step 130: Marking wrappers in the new space of the guest heap that are included in the list of marked wrappers in the eden graph. This marking phase has to mark (not only marked wrappers in the eden graph but also) all reachable objects from the marked wrappers in the eden graph. This step can be considered as a continuation of the marking phase in Step 110.

Step 135: Collecting unmarked objects from the host heap and the guest heap.

For purpose of explanation, an example process for a generational garbage collector according to some configurations of the subject technology is provided based on one host heap and one guest heap. However, it is again noted that the example process can also be utilized for one host heap and a plurality of N guest heaps.

Figure 2:
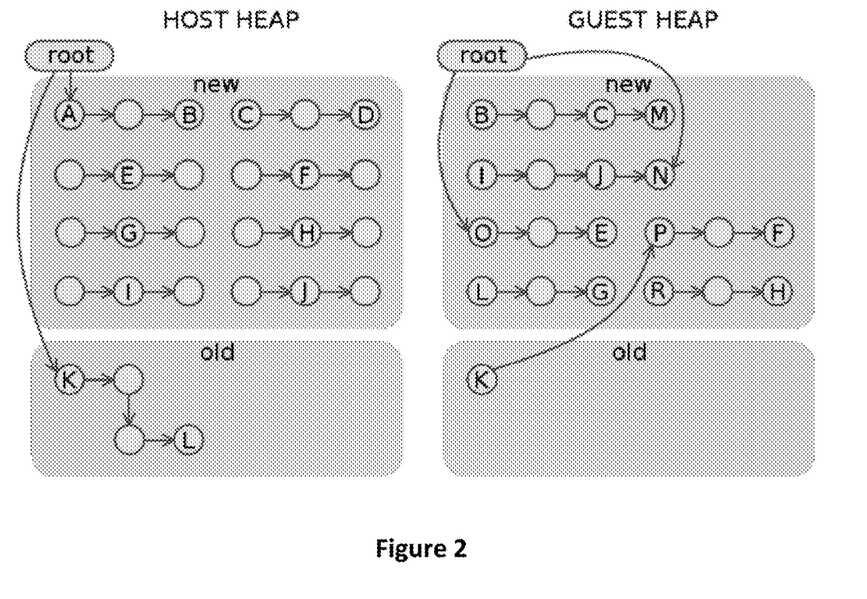
FIG. 2 illustrates an initial stage in an example process for a generational garbage collector according to some configurations of the subject technology.

FIG. 2 illustrates an initial stage in an example process for a generational garbage collector according to some configurations of the subject technology. As illustrated in FIG. 2, a host heap and a guest heap are provided for storing one or more objects.

Initially, a situation as illustrated in FIG. 2 is assumed for this example. The relationship between the host heap and one of the guest heaps is described below:

<A>, <B>, <C>, <D>, <E>, <F>, <G>, <H>, <I>, <J>, <K>, <L>, <M>, <N>, <O>, <P> and <R> are wrappers. Other objects are nonwrappers (e.g., pure JavaScript objects).

<B>, <C>, <E>, <F>, <G>, <H>, <I>, <J>, <K> and <L> are wrappers between the host heap and the guest heap. <A> and <D> are wrappers between the host heap and another guest heap.

<M>, <N>, <O>, <P> and <R> are wrappers between the guest heap and another guest heap.

In the guest heap, the following relationships are included:
<B>, <C> and <M> are reachable from the root of the host heap.

<I> and <J> are garbage.

<N>, <O> and <E> are reachable from the root of the guest heap.

<P> and <F> are reachable from the old space of the guest heap.

<L> and <G> are reachable from the old space of the host heap.

<R> and <H> are reachable from the new/old space of another guest heap.

In some configurations, the objective of the example process is to collect the object <I> and <J> shown in FIG. 2.

Figure 3:
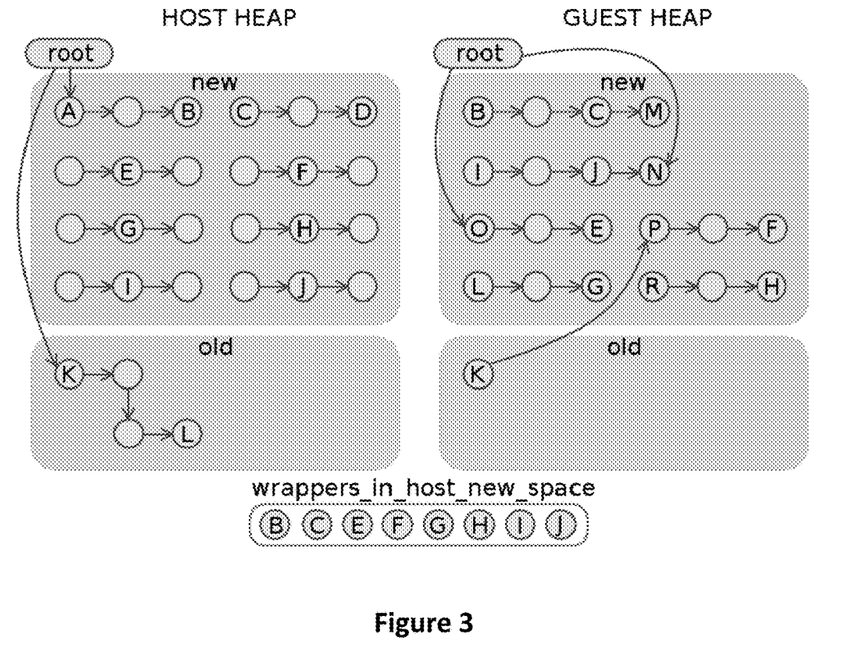
FIG. 3 illustrates a second stage in an example process for a generational garbage collector according to some configurations of the subject technology.

FIG. 3 illustrates a second stage in an example process for a generational garbage collector according to some configurations of the subject technology. The second stage can be implemented as step 105 in the example process 100 illustrated in FIG. 1. As illustrated in FIG. 3, a host heap and a guest heap are provided for storing one or more objects.

In one example, the host heap tells a list of wrappers in the new space of the host heap (wrappers_in_host_new_space) to the guest heap. <A> and <D> are not contained in the list, because these are not the wrappers between the host heap and the guest heap that the process is interested in.

Figure 4:
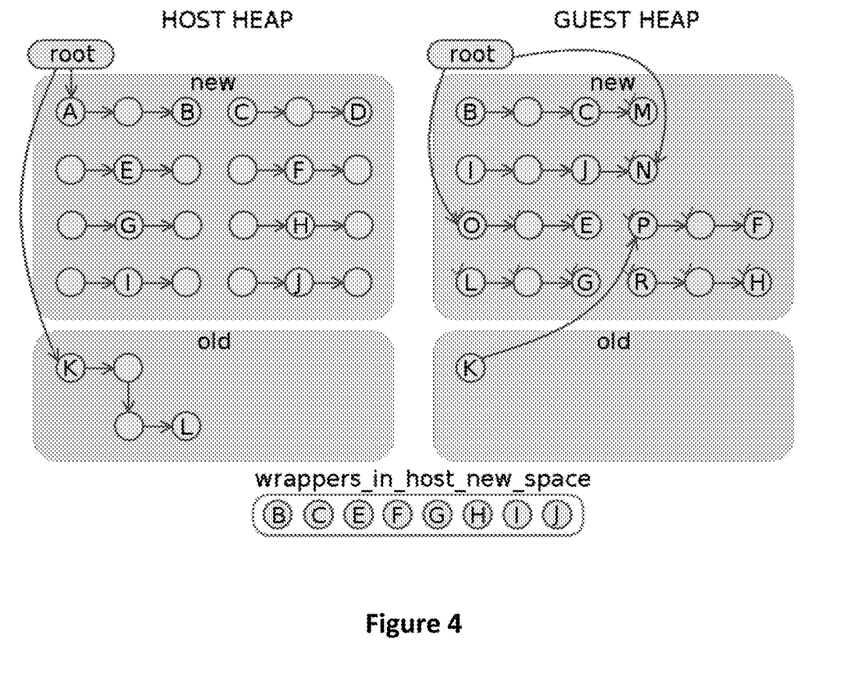
FIG. 4 illustrates a third stage in an example process for a generational garbage collector according to some configurations of the subject technology.

FIG. 4 illustrates a third stage in an example process for a generational garbage collector according to some configurations of the subject technology. The third stage can be implemented as step 110 in the example process 100 illustrated in FIG. 1. As illustrated in FIG. 4, a host heap and a guest heap are provided for storing one or more objects.

Next, the guest heap marks objects in the new space of the guest heap. The root objects of the marking phase are as follows:

Normal root objects of the guest heap.

Remembered set of the guest heap (i.e. Objects in the new space of the guest heap that are referenced from the old space of the guest heap).

Wrappers in the new space of the guest heap that are not contained in wrappers_in_host_new_space.

In other words, the only special part of the marking phase is that "wrappers in the new space of the guest heap that are contained in wrappers_in_host_new_space" are not treated as root objects. Specifically, <B>, <C>, <I> and <J> are not treated as root objects in the marking phase.

Figure 5:
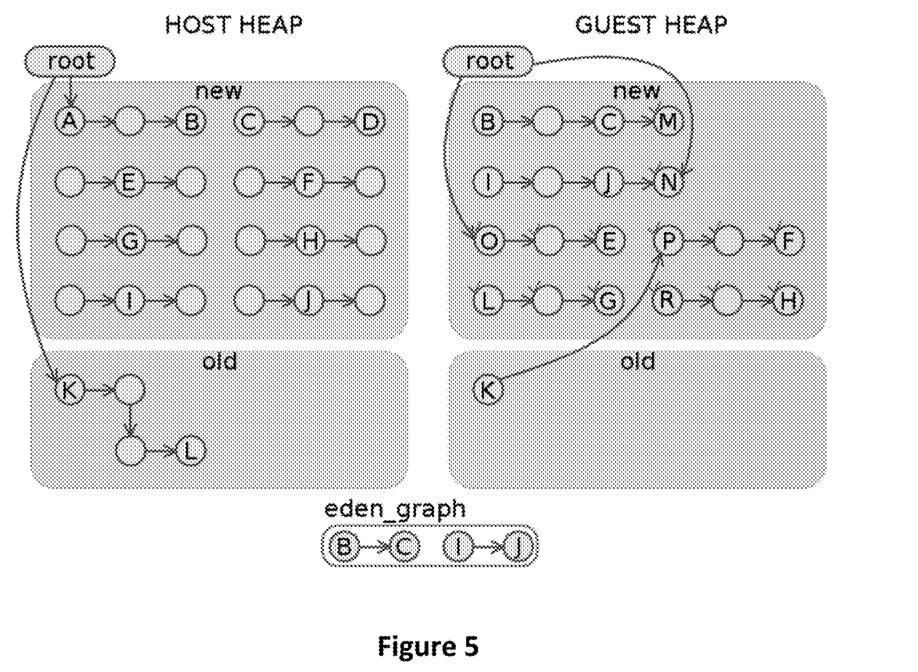
FIG. 5 illustrates a fourth stage in an example process for a generational garbage collector according to some configurations of the subject technology.

FIG. 5 illustrates a fourth stage in an example process for a generational garbage collector according to some configurations of the subject technology. The fourth stage can be implemented as step 115 in the example process 100 illustrated in FIG. 1. As illustrated in FIG. 5, a host heap and a guest heap are provided for storing one or more objects.

As shown in FIG. 5, the guest heap builds up an eden graph. In one example, the eden graph is built up as a graph of unmarked wrappers in the new space of the guest heap.

More specifically, <B>=> <C> and <I>=> <J> are added to the eden graph. By building up the eden graph as a graph of unmarked wrappers in the new space of the guest heap, the following conditions are guaranteed for the eden graph:

[1] All nodes in the eden graph are wrappers between the host heap and the guest heap.

[2] A wrapper X in the eden graph is unreachable if all ancestor wrappers of X in the eden graph are unreachable in the new space of the host heap.

It is clear that the eden graph guarantees [1]. Regarding [2], remember that the marking phase treats "wrappers that are reachable from spaces other than the new space of the host heap" as root objects. As a result, unmarked objects in the new space of the guest heap constitute a set of objects that are not reachable without being reachable from the new space of the host heap. Therefore, by building up the eden graph as a graph of unmarked wrappers in the new space of the guest heap, [2] is also guaranteed.

Figure 6:
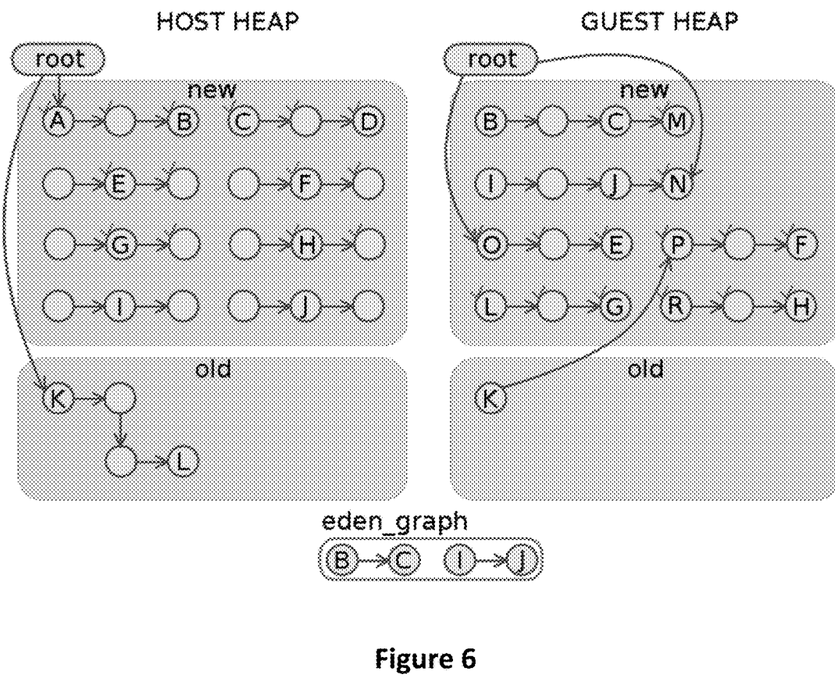
FIG. 6 illustrates a fifth stage in an example process for a generational garbage collector according to some configurations of the subject technology.

FIG. 6 illustrates a fifth stage in an example process for a generational garbage collector according to some configurations of the subject technology. The fifth stage can be implemented as step 120 in the example process 100 illustrated in FIG. 1. As illustrated in FIG. 6, a host heap and a guest heap are provided for storing one or more objects.

Next, as illustrated in FIG. 6, the host heap marks objects in the new space of the host heap, taking into account the reachability in the eden graph. Specifically, the host heap considers that there is a reference from <B> to <C> and from <I> to <J>. The root objects of the marking phase are as follows:

Normal root objects of the host heap.

Remembered set of the host heap (i.e. Objects in the new space of the host heap that are referenced from the old space of the host heap).

Wrappers in the new space of the host heap that are not contained in the eden graph.

One notable feature of the marking phase is that "wrappers in the new space of the host heap that are not contained in the eden graph" are not treated as root objects. Specifically, <B>, <C>, <I> and <J> are not treated as root objects. Why is <D> marked? This is because: <B> is marked because <B> is reachable from root objects; <C> is marked because <B>=> <C> is in the eden graph; <D> is marked because <D> is reachable from <C>.

Note that <I> and <J> are not marked in the marking phase as shown in FIG. 6.

Figure 7:
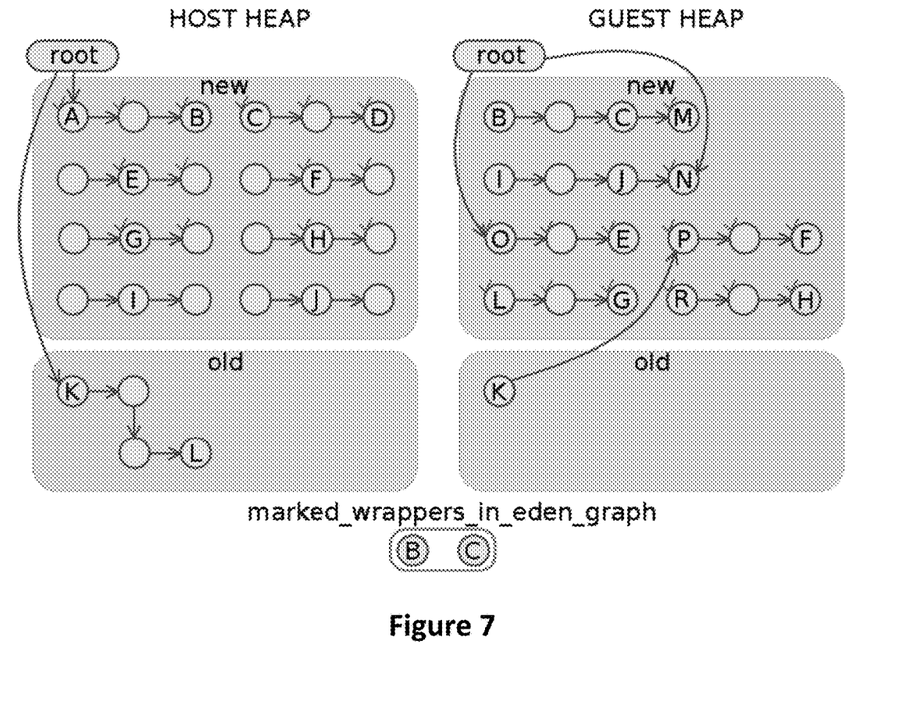
FIG. 7 illustrates a sixth stage in an example process for a generational garbage collector according to some configurations of the subject technology.

FIG. 7 illustrates a sixth stage in an example process for a generational garbage collector according to some configurations of the subject technology. The sixth stage can be implemented as step 125 in the example process 100 illustrated in FIG. 1. As illustrated in FIG. 7, a host heap and a guest heap are provided for storing one or more objects.

As illustrated in FIG. 7, next, the host heap tells a list of marked wrappers in the eden graph (marked_wrappers_in_eden_graph) to the guest heap. By using this information, the guest heap can know which wrappers are marked or unmarked in the host side. Specifically, <B> and <C> are stored in marked_wrappers_in_eden_graph. <I> and <J> are not stored in marked_wrappers_in_eden_graph because these objects are not marked.

Figure 8:
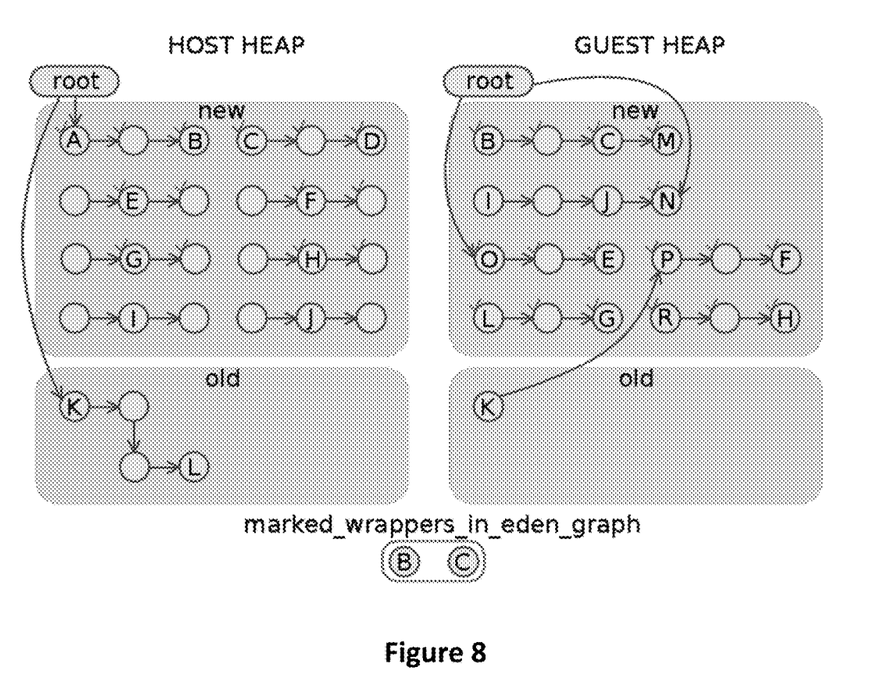
FIG. 8 illustrates a seventh stage in an example process for a generational garbage collector according to some configurations of the subject technology.

FIG. 8 illustrates a seventh stage in an example process for a generational garbage collector according to some configurations of the subject technology. The seventh stage can be implemented as step 130 in the example process 100 illustrated in FIG. 1. As illustrated in FIG. 8, a host heap and a guest heap are provided for storing one or more objects.

Next, as shown in FIG. 8, the guest heap marks wrappers in marked_wrappers_in_eden_graph and transitively marks objects in the new space of the guest heap. This marking phase can be interpreted as a continuation of the marking phase that the guest heap did as previously described in FIG. 5.

Figure 9:
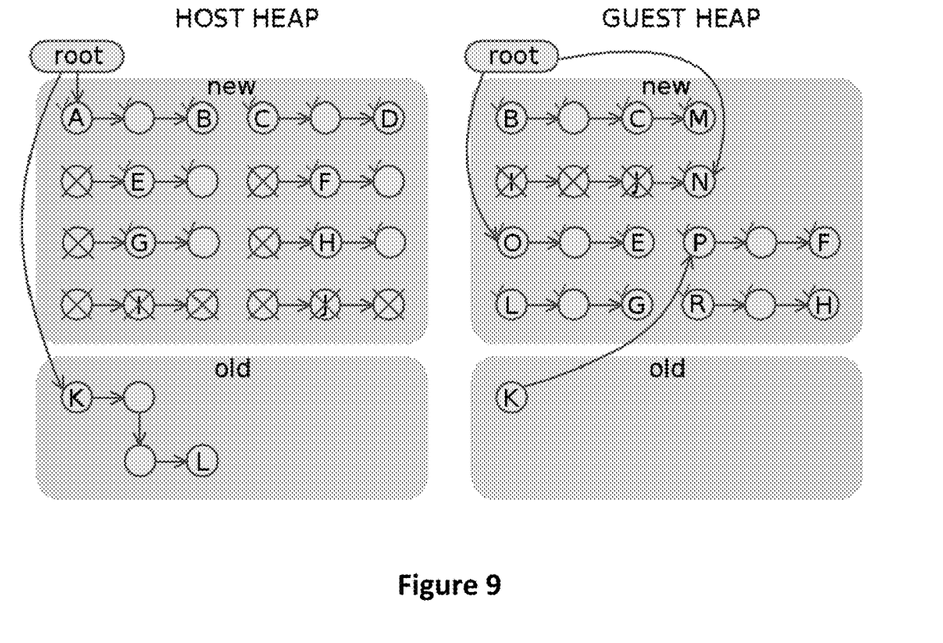
FIG. 9 illustrates an eighth stage in an example process for a generational garbage collector according to some configurations of the subject technology.

FIG. 9 illustrates an eighth stage in an example process for a generational garbage collector according to some configurations of the subject technology. The eighth stage can be implemented as step 135 in the example process 100 illustrated in FIG. 1. As illustrated in FIG. 9, a host heap and a guest heap are provided for storing one or more objects.

The host heap and the guest heap collect unmarked objects as illustrated in FIG. 9. The process may then end for this cycle of garbage collection.

Figure 10:
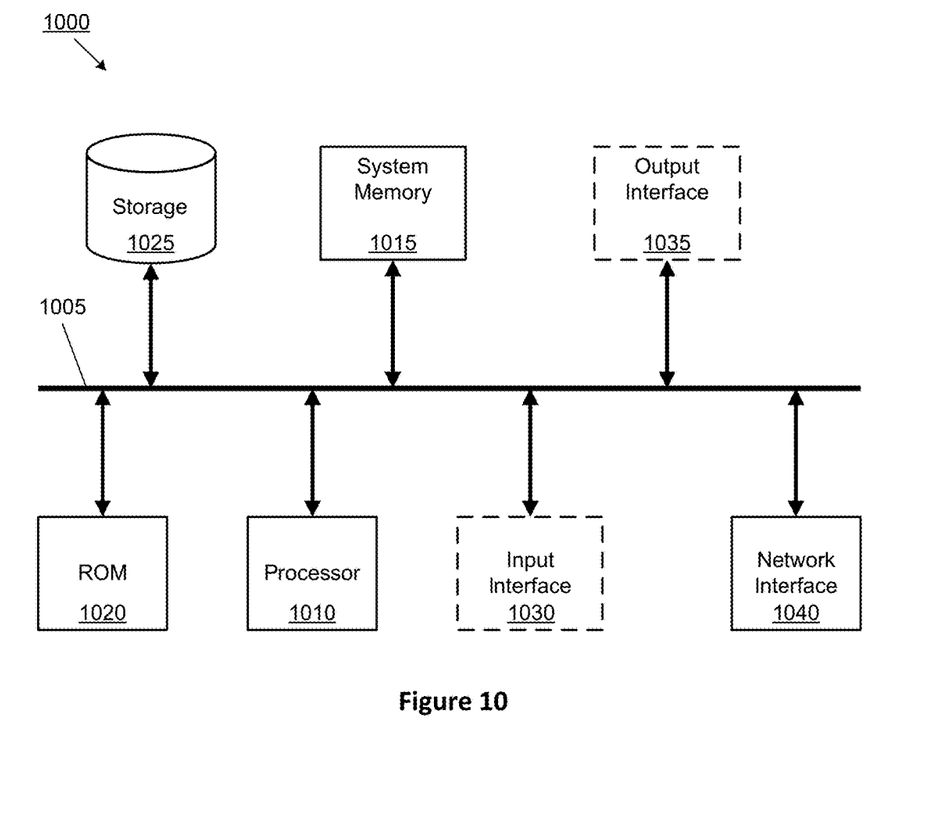
FIG. 10 conceptually illustrates a system with which some implementations of the subject technology can be implemented.

FIG. 10 conceptually illustrates a system 1000 with which some implementations of the subject technology can be implemented. The system 1000 can be a computer, phone, PDA, or another sort of electronic device. Such a system includes various types of computer readable media and interfaces for various other types of computer readable media. The system 1000 includes a bus 1005, processing unit(s) 1010, a system memory 1015, a read-only memory 1020, a storage device 1025, an optional input interface 1030, an optional output interface 1035, and a network interface 1040.

The bus 1005 collectively represents all system, peripheral, and chipset buses that communicatively connect the numerous internal devices of the system 1000. For instance, the bus 1005 communicatively connects the processing unit(s) 1010 with the read-only memory 1020, the system memory 1015, and the storage device 1025.

From these various memory units, the processing unit(s) 1010 retrieves instructions to execute and data to process in order to execute the processes of the subject technology. The processing unit(s) can be a single processor or a multi-core processor in different implementations.

The read-only-memory (ROM) 1020 stores static data and instructions that are needed by the processing unit(s) 1010 and other modules of the system 1000. The storage device 1025, on the other hand, is a read-and-write memory device. This device is a non-volatile memory unit that stores instructions and data even when the system 1000 is off. Some implementations of the subject technology use a mass-storage device (such as a magnetic or optical disk and its corresponding disk drive) as the storage device 1025.

Other implementations use a removable storage device (such as a flash drive, a floppy disk, and its corresponding disk drive) as the storage device 1025. Like the storage device 1025, the system memory 1015 is a read-and-write memory device. However, unlike storage device 1025, the system memory 1015 is a volatile read-and-write memory, such a random access memory. The system memory 1015 stores some of the instructions and data that the processor needs at runtime. In some implementations, the subject technology's processes are stored in the system memory 1015, the storage device 1025, and/or the read-only memory 1020. For example, the various memory units include instructions for processing multimedia items in accordance with some implementations. From these various memory units, the processing unit(s) 1010 retrieves instructions to execute and data to process in order to execute the processes of some implementations.

The bus 1005 also connects to the optional input and output interfaces 1030 and 1035. The optional input interface 1030 enables the user to communicate information and select commands to the system. The optional input interface 1030 can interface with alphanumeric keyboards and pointing devices (also called "cursor control devices"). The optional output interface 1035 can provide display images generated by the system 1000. The optional output interface 1035 can interface with printers and display devices, such as cathode ray tubes (CRT) or liquid crystal displays (LCD). Some implementations can interface with devices such as a touchscreen that functions as both input and output devices.

Finally, as shown in FIG. 10, bus 1005 also couples system 1000 to a network interface 1040 through a network adapter (not shown). In this manner, the computer can be a part of a network of computers (such as a local area network ("LAN"), a wide area network ("WAN"), or an Intranet, or an interconnected network of networks, such as the Internet. The components of system 1000 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself As used in this specification and the claims of this application, the terms "computer", "server", "processor", and "memory" all refer to electronic or other technological devices. These terms exclude people or groups of people. For the purposes of the specification, the terms display or displaying means displaying on an electronic device. As used in this specification and the claims of this application, the terms "computer readable medium" and "computer readable media" are entirely restricted to tangible, physical objects that store information in a form that is readable by a computer. These terms exclude wireless signals, wired download signals, and other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be a form of sensory feedback, e.g., visual feedback, auditory feedback, or tactile feedback; and input from the user can be received in a form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by a form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that a specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable a person skilled in the art to practice the various aspects described herein. Various modifications to these aspects will be readily apparent to those skilled in the art, and the generic principles defined herein can be applied to other aspects. Reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method, the method comprising:
   determining a first set of objects, in a new space of a first heap, that include a reference to at least one object in a second heap;
   marking a second set of objects in a new space of the second heap, wherein the second set of objects comprises wrapper objects that are reachable from spaces other than the new space of the first heap;

building an eden graph comprising a third set of objects in the new space of the second heap, wherein the third set of objects comprises unmarked wrapper objects in the new space of the second heap such that the third set of objects does not include objects from the second set of objects;

marking a fourth set of objects in the new space of the first heap based on reachability in the eden graph;

marking a fifth set of objects in the new space of the second heap, the fifth set of objects being based on the fourth set of objects; and collecting a set of unmarked objects from the first heap and the second heap.

2. The method of claim 1, wherein the fifth set of objects comprises a set of wrapper objects.

3. The method of claim 2, wherein each wrapper object of the set of wrapper objects is a JavaScript wrapper object.

4. The method of claim 2, wherein each wrapper object of the set of wrapper objects is bidirectionally referenced.

5. The method of claim 1, further comprising syncing between the second heap and at least one other heap.

6. The method of claim 1, wherein the first heap includes a set of non-wrapper objects.

7. The method of claim 1, wherein the first heap includes a set of wrapper objects that reference another heap different than the second heap.

8. The method of claim 1, wherein each object in the third set of objects comprises a respective wrapper object between the first heap and the second heap.

9. The method of claim 8, wherein the respective wrapper object of each object in the third set of objects is unreachable if all ancestor wrapper objects of the respective wrapper object in the graph are unreachable in the new space of the first heap.

10. The method of claim 1, wherein at least one object of the fourth set of objects is referenced by at least one object of the third set of objects.

11. The method of claim 1, wherein the second set of objects comprises at least one object in the new space of the second heap that is referenced by an object in an old space of the second heap.

12. The method of claim 1, wherein at least one object of the third set of objects is referenced by at least one object in the first set of objects.

13. The method of claim 1, wherein at least one object of the second set of objects is referenced by at least one object in the first set of objects.

14. The method of claim 1, further comprising, triggering garbage collection on the first heap, each of the determining, the marking the second set of objects, the building, the marking the fourth set of objects, the marking the fifth set of objects, and the collecting being in response to triggering the garbage collection on the first heap.

15. The method of claim 1, wherein the second set of objects comprises:
a root object of the second heap,
a first object in the new space of the second heap that is referenced by an object in an old space of the second heap, and
each object of the first set of objects that is reachable from at least one of the root object or the first object.

16. The method of claim 1, wherein the fourth set of objects comprises:
a root object of the first heap, and
each object of the third set of objects that is reachable from the root object.

17. A system, the system comprising:
one or more processors;
a memory comprising instructions stored therein, which when executed by the one or more processors, cause the processors to perform operations comprising:
determining a first set of objects in a new space of a first heap that include a reference to at least one object in a second heap;
marking a second set of objects in a new space of the second heap, wherein the second set of objects comprises wrapper objects that are reachable from spaces other than the new space of the first heap;
building eden graph comprising a third set of objects in the new space of the second heap, wherein the third set of objects comprises unmarked wrapper objects in the new space of the second heap such that the third set of objects does not include objects from the second set of objects;
marking a fourth set of objects in the new space of the first heap based on reachability in the eden graph;
marking a fifth set of objects in the new space of the second heap, the fifth set of objects being based on the fourth set of objects; and
collecting a set of unmarked objects from the first heap and the second heap.

18. The system of claim 17, wherein the fifth set of objects comprises a set of wrapper objects.

19. The system of claim 18, wherein each wrapper object of the set of wrapper objects is bidirectionally referenced.

20. The system of claim 17, wherein the first heap includes a set of non-wrapper objects.

21. The system of claim 17, wherein the first heap includes a set of wrapper objects that reference another heap different than the second heap.

22. The system of claim 17, wherein each object in the third set of objects comprises a respective wrapper object between the first heap and the second heap.

23. The system of claim 22, wherein the respective wrapper object of each object in the third set of objects is unreachable if all ancestor wrapper objects of the respective wrapper object in the graph are unreachable in the new space of the first heap.

24. A non-transitory machine-readable medium comprising instructions stored therein, which when executed by a machine, cause the machine to perform operations comprising:
determining a first set of objects in a new space of a first heap that include a reference to at least one object in a second heap;
marking a second set of objects in a new space of the second heap, wherein the second set of objects comprises wrapper objects that are reachable from spaces other than the new space of the first heap;
building eden graph comprising a third set of objects in the new space of the second heap, wherein the third set of objects comprises unmarked wrapper objects in the new space of the second heap such that the third set of objects does not include objects from the second set of objects;
marking a fourth set of objects in the new space of the first heap based on reachability in the eden graph;
marking a fifth set of objects in the new space of the second heap, the fifth set of objects being based on the fourth set of objects; and
collecting a set of unmarked objects from the first heap and the second heap.

* * * * *